H. L. SHARPE.
POWER TRANSMISSION MECHANISM.
APPLICATION FILED APR. 26, 1916.
1,254,856.
Patented Jan. 29, 1918.
2 SHEETS—SHEET 2.
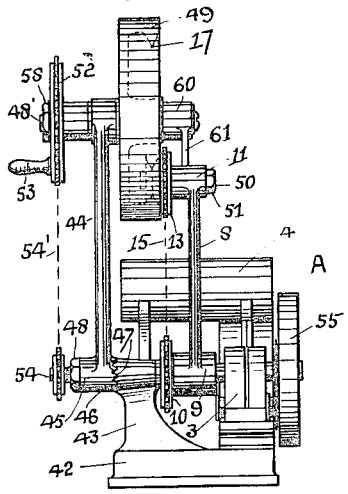
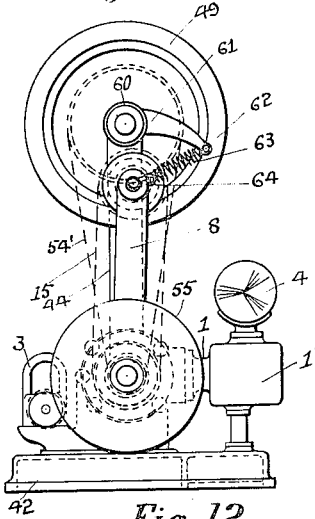
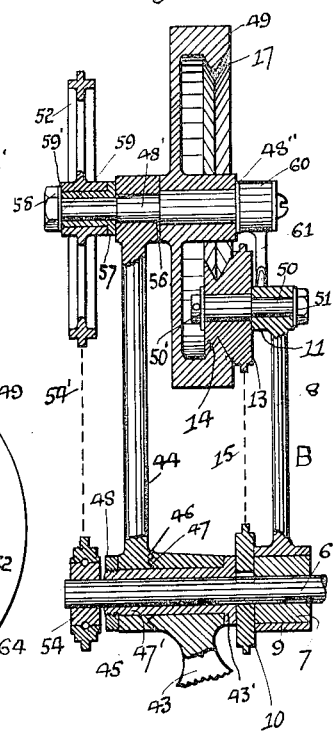
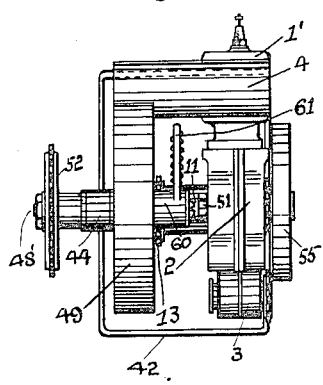
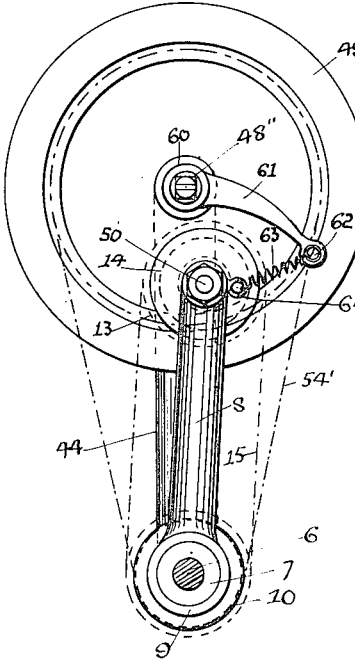
Inventor
Horace Lawrence Sharpe
Attorney

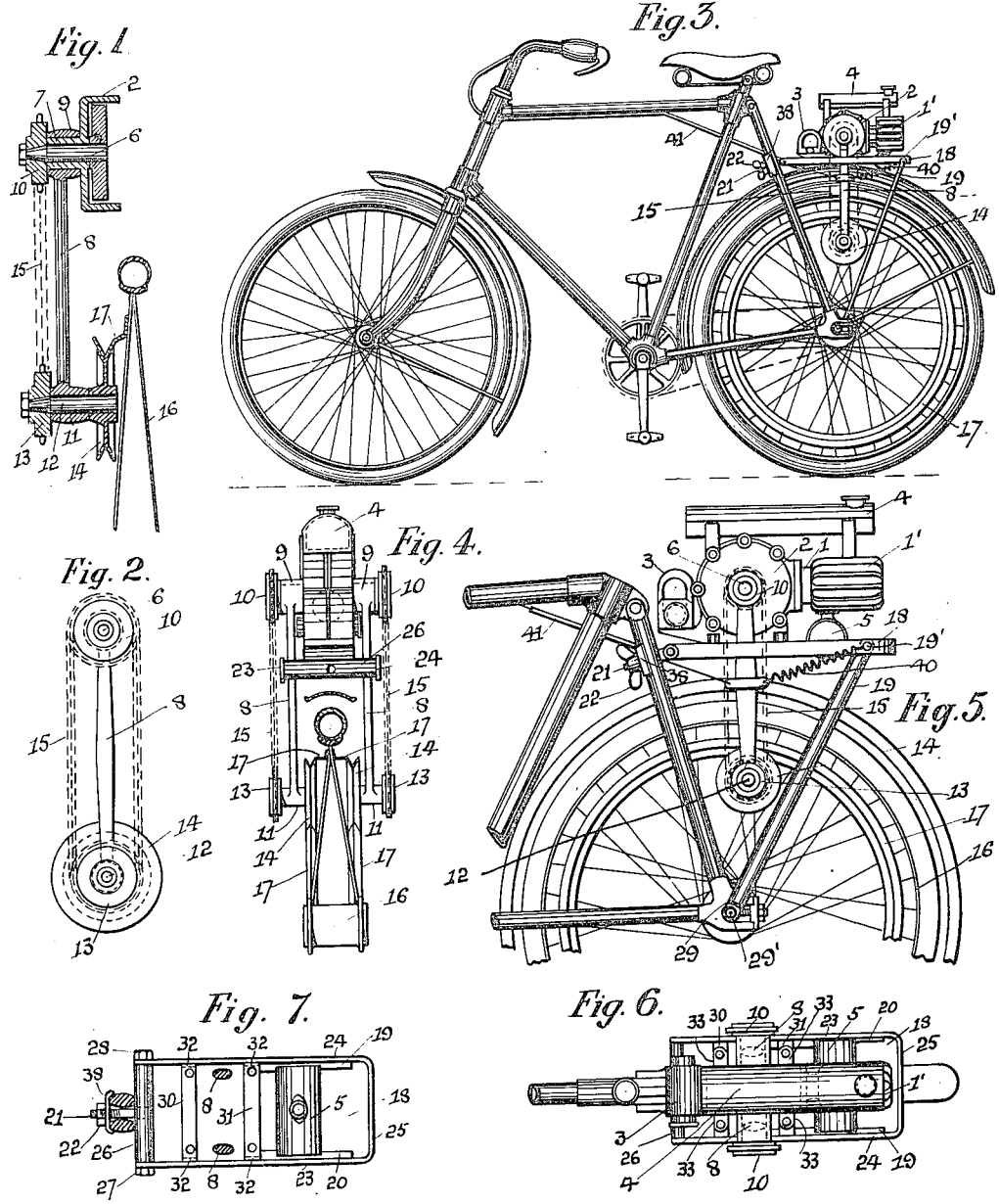

UNITED STATES PATENT OFFICE.

HORACE LAWRENCE SHARPE, OF BALHAM, LONDON, ENGLAND, ASSIGNOR TO THE LONDON AND WESTMINSTER INDUSTRIAL SYNDICATE LIMITED, OF LONDON, ENGLAND.

POWER-TRANSMISSION MECHANISM.

1,254,856.

Specification of Letters Patent.

Patented Jan. 29, 1918.

Application filed April 26, 1916. Serial No. 93,750.

*To all whom it may concern:*

Be it known that I, HORACE LAWRENCE SHARPE, a subject of His Majesty the King of Great Britain, whose post-office address is 256 High road, Balham, London, England, have invented new and useful Power-Transmission Mechanism, of which the following is a specification.

My invention relates to improvements in means for the application and transmission of motor power to bicycles and other light road vehicles, small lathes, drilling, sewing and other light machines of that type in which a friction wheel is or friction wheels are carried by a part rocking on a portion of the vehicle to be driven or on the shaft of a motor or engine from which the driving power is derived, the said friction wheel or wheels being operated by the engine or motor whose power is to be transmitted through such friction wheel or wheels and a driving surface with which the friction wheel or wheels contacts or contact to the vehicle or machine to be driven and the objects of my improvements are, first, to afford greater facilities or simpler means than those previously employed for the conversion of bicycles and other light road vehicles designed for propulsion by foot into power driven vehicles; second, to provide a machine driving unit which is adaptable for use in awkward situations and, third, to enable the application of a wedge driving contact between the driving surface and the friction wheel or wheels, thus dispensing with the employment of springs, levers or other extraneous means for bringing the contacting surfaces together and maintaining the same for driving purposes.

By "wedge driving contact" as herein referred to is meant the contact between a friction wheel and an annular driving surface, the friction wheel and driving surface being so placed relatively to each other that when such parts are in motion the frictional contact between the two increases or diminishes in the same ratio as the power exerted and the resistance, *i. e.* if either the resistance (or load) or power transmitted, or both, be increased the frictional contact would be increased and vice-versa.

I attain the objects of my improvements by the mechanism illustrated in the accompanying drawings in which:—

Figure 1 is side view (mainly in section) of the transmission means arranged at one side of an engine or motor and at one side of the rear wheel of an ordinary bicycle usually propelled by foot, *i. e.* as a single drive.

Fig. 2 is elevation of part of what is shown in Fig. 1.

Fig. 3 is side elevation of an ordinary bicycle usually propelled by foot with an engine or motor and the transmission means as shown in Fig. 1 applied thereto at one side of the rear road wheel.

Fig. 4 is front elevation of the transmission means as shown in Fig. 1 arranged at each side of the rear road wheel of an ordinary bicycle usually propelled by foot (*i. e.* as a double drive) with an engine or motor.

Fig. 5 is side elevation of rear part of an ordinary bicycle usually propelled by foot with an engine or motor and the transmission means as illustrated by Fig. 4 applied thereto at both sides of the rear road wheel.

Fig. 6 is plan view of same.

Fig. 7 is plan view of an example of engine supporting frame with engine exhaust silencer and means for attachment of engine or motor frame to bicycle frame.

Fig. 8 is end elevation of an engine or motor for driving small lathes and other machines with my invention embodied therewith.

Fig. 9 is side elevation of same viewed from side A Fig. 8.

Fig. 10 is plan view of same.

Fig. 11 is end elevation, mainly in section and drawn to a larger scale, of my invention for embodiment with an engine or motor for driving lathes and the like with part of support for belt wheel standard on engine or motor bed and part of engine or motor crank shaft and crank case.

Fig. 12 is part side elevation of same viewed from side B Fig. 11.

The same reference numerals denote the same parts throughout the several figures.

Referring to Figs. 3, 4, 5 and 6, which illustrate the method and means by which a bicycle ordinarily designed for foot propulsion may according to this invention be converted either temporarily or permanently into a power driven machine, 1 is a petrol engine or motor, 1' being the cylinder, 2 the crank case, 3 the magneto, 4 the fuel tank and 5 the silencer—all such parts being well known·no further description thereof or of the engine or motor as a whole is necessary.

The engine or motor employed may be of any ordinary type slightly modified in reference to the crank shaft as will hereinafter appear.

Referring to Figs. 1, 2 and 3 which illustrate the means by which a bicycle ordinarily designed for foot propulsion may according to this invention be converted either temporarily or permanently into a power driven machine having a single drive, i. e. having the power transmitted to the road wheel at one side thereof, the crank shaft is prolonged at one end thereof as at 6 (Fig. 1) so that it projects beyond the crank case at one side thereof.

As will be seen the crank shaft when the invention is in position on a bicycle or the like vehicle is so disposed as to be at a right angle to the driven road wheel, i. e. parallel with the spindle on which the driven road wheel rotates, in order that a bar 8 may be suspended thereon as to be capable of a swinging movement. It is, however, preferred to also prolong the crank case bearing as at 7 and suspend the bar 8 on such prolongation of the crank case bearing. The said bar is provided with the bored cross piece 9 for the reception of the prolonged end of the crank shaft or the prolonged crank case bearing. When the bar 8 is in its suspended position the end of the crank shaft projects beyond the cross piece 9.

Rigidly secured to the end of the crank shaft projecting beyond the cross piece 9 is, as shown, a sprocket wheel 10. The lower end of the bar 8 carries the cross bearing 11 in which rotates the shaft 12, the said shaft at one end having rigidly secured thereto the sprocket wheel 13 and rigidly at its other end the friction wheel 14.

The shaft 12 is caused to rotate by means of the sprocket chain 15 and the wheels 10 and 13 when the crank shaft of the engine or motor is in motion.

Preferably the friction wheel 14 (which may be of vulcanized fiber or partly of fiber and partly of metal or other suitable material) is formed with a groove of V shape peripherally but it may be peripherally formed plain or with a groove of any suitable shape. To the rear wheel of the bicycle or the like (represented at 16) is secured in any suitable way and at that side thereof at which the friction wheel depends a driving rim such as 17. Such driving rim is shaped as shown in Fig. 1 when the friction wheel has a V shaped groove, or when the friction wheel is otherwise shaped peripherally the driving rim is correspondingly shaped and on the same principle as to convexity and concavity (which, however, may be reversed) as disclosed in the figures. If the bar 8 is suspended directly on the crank shaft it is desirable that the cross piece 9 be provided with ball bearings as will be clearly understood.

As will be seen the engine or motor carrying the transmission means is located above the rear road wheel 16 of the bicycle and at the rear of the saddle and may be secured to the frame of the bicycle by any suitable means. The means it is preferred to employ consist of mounting the engine or motor upon a frame such as 18 mainly composed of flat strip metal as shown in Fig. 5, the engine or motor and its frame being supported on and secured to the bicycle by the supports 19. 20. and the bolt 21 and wing nut 22. As illustrated by Figs. 6 and 7, both sides 23. 24. and one end 25. of the engine or motor frame may be formed by bending a length of metal strip into the shape shown while the other end is formed of the stiffer part 26 secured to the side members preferably by passing its reduced screw threaded ends through perforations in the sides 23. 24. and screwing nuts thereon down on to such sides as shown at 27. 28. Fig. 7. In the frame end 26 is secured the screw threaded bolt 21. The supports 19 and 20 at one end are secured near the rear end of the engine or motor frame (as at 19'), the other ends 29 of such supports being perforated for the purpose as will hereinafter appear. 30 and 31 are cross strips secured to the sides 23 and 24 of the engine or motor frame by means of their respective ends 32 being bent at a right angle to the other part thereof for the purpose of being riveted or otherwise secured to the side members 23 and 24 of the frame. To these cross strips is bolted the engine or motor by means of the engine lugs 33. The engine or motor frame may, however, be formed of tubing as will be fully understood.

As will be obvious the engine or motor frame as herein described is applicable equally to the cases of a single or double drive.

To secure the engine or motor frame to the bicycle or the like the bolt 21 carried by the front end of the frame is placed between the back stays of the bicycle or the like and through the perforated curved piece or nut seating 38 and the wing nut screwed down on to same, the supports 19 and 20 at their lower ends being secured to the spindle 29' on which the driven road wheel rotates by passing the ends of such spindle through the perforation in the lower ends of the engine or motor frame supports 19 and 20 and screwing the usual retaining nuts on to the spindle. When the device is in position on the vehicle the bar 8 is slightly to the rear of the center (perpendicular) line of the driven road wheel.

It will be seen on reference to Fig. 3 that the bar 8 being free to swing on its point of suspension in a plane parallel with the driven road wheel the friction wheel 14 also swings with the said bar and can move in one direction into engagement with the driving rim 17 and in the other direction out of engagement with the said rim. In the former case, as will be obvious, the power of the engine is transmitted (through the sprocket wheel 10 on the engine shaft, the sprocket chain 15 and the sprocket wheel 13 and friction wheel 14 on the shaft 12) to the road wheel. In the latter case the friction wheel runs free of the driving rim and no power is then transmitted. Normally the friction wheel may be held in engagement with the driving rim by means of a tension spring 40, one end of which being secured to the engine frame and the other to the bar 8. The friction wheel is moved out of engagement with the driving rim by any suitable means, preferably by the Bowden wire 41, one end of which being secured to the bar 8 and the other end being brought to a convenient point for operation by the rider. The engine may be started by pushing or pedaling the vehicle (the friction wheel being in engagement with the driving rim) or (particularly in the case of machines for ladies' use) by a suitable crank handle.

In Figs. 4, 5 and 6 is shown the transmission device hereinbefore described arranged as a double drive, i. e., for transmitting the power of the motor or engine to the driven road wheel at both sides thereof. In such case, as will be seen more clearly by Fig. 4, there are secured to the driven road wheel two driving rims 17. 17. so that there is a driving rim at each side of the wheel and the crank shaft is prolonged at both its ends and preferably the crank shaft bearing at each side of the crank case. The prolongations of the crank shaft and of the crank case bearing in this instance are in all respects identical with the prolongation of such parts as hereinbefore described in reference to a single drive. The transmission gear is duplicated, i. e., such gear is applied to each end of the crank shaft in the manner already referred to. There are thus two complete sets of the transmission gear, one set being suspended at one side of the crank case and driven road wheel and the other set at the other side of the crank case and driven road wheel, as clearly shown in Fig. 4, both bars 8 being slightly to the rear of the center (perpendicular) line of the driven road wheel. The engine or motor is mounted on the frame of the vehicle as before described and the swinging of the bar 8 may be effected as before referred to.

From the above description the application of the device to the case of three wheeled vehicles will be obvious.

In all cases a suitable guard for keeping the rider's dress from contact with the device is provided.

When the invention is to be utilized in the case of driving light machines such, for example, as lathes, sewing, polishing and drilling machines, as illustrated in Figs. 8 to 12, I provide the engine or motor with a belt driving wheel. One end of the crank shaft of the engine or motor is prolonged as previously referred to relatively to road vehicles, and at its projecting end rigidly carries the sprocket wheel 10 as before: and the engine or motor is secured to a bed plate 42 which plate rigidly carries a support 43 for a standard 44. The standard 44 is so mounted in relation to the support 43 as to permit such standard being swung into any desired position and held in such position. For this purpose I provide the standard with an eye piece 45 which is preferably divergently corrugated at 46 to correspond with divergent corrugations 47 in the support 43 as shown.

The standard 44 may be held to the support 43 by means of a bolt passing through the eye piece 45 and screwing such bolt into the head of the support until the bolt head jams on to the eye piece. As, however, it is of importance, as will hereinafter appear, that the pivoting point of the standard be in accurate alinement with the crank shaft of the engine or motor it is preferred that the crank shaft be utilized as the pivot about which the standard moves and in that case, and as shown in Figs. 8 and 11 the crank shaft is so extended as to pass through the bored-through head of the supports 43 and to protrude beyond such head. 47' is a hollow bolt having screw threads formed at its tail end and provided with the head 43' which bolt is inserted in the head of the support 43, the head of the bolt abutting against the side of the support head as shown. The protruding end of the crank shaft rotates in the hollow bolt. On the bolt near the tail end thereof and which end projects beyond the support head, is mounted (by means of the eye piece 45) the standard 44. On screwing up the nut 48 with which the tail end of the bolt 47' is furnished the head 43' of the bolt is drawn tightly on to one side of the head of the support 43 and the standard 44 is at same time pressed on to the other side of the support head. In this way while the rotation of the crank shaft is in no way obstructed the standard 44 is rigidly held in any desired position. In this arrangement the sprocket wheel 10 is secured to the crank shaft by means of a sunk key. The standard 44 at its end opposite the eye piece 45 rigidly carries a short shaft 48' on which the driving belt wheel 49 above referred to rotates. To such belt wheel a suitable driving rim 17 grooved or otherwise shaped peripherally as hereinbefore referred to may be secured. I, however, prefer to form the belt wheel as shown in Figs. 8 and 11 so that the driving rim 17 is integral with the belt wheel 49. The bar 8 as shown in Figs. 8, 9 11, 12 is swingingly supported on the crank shaft or preferably on the crank case, bearing on the crank shaft, with the friction wheel 14 above the engine. I prefer also in this application of my invention to form the sprocket wheel 13 integral with the friction wheel 14 and rotatably mount them on a short shaft 50 which shaft is held rigidly in this instance in the cross piece 11 of the bar 8 by the nut 51, the shaft 50 being in two diameters for the purpose of forming a shoulder against which the cross piece 11 of the bar 8 may be held tightly by the nut 51, the end of the larger diameter of the shaft being reduced to receive the ring 50', which is pinned to the shaft to retain the wheels 13 and 14 in position thereon. In order to start the engine or motor there is rotatably supported on the shaft 48' a sprocket wheel 52 furnished with the handle 53 and there is rigidly secured to the end of the crank shaft 6 the free wheel clutch 54 which is operated through the sprocket chain 54' and wheel 52. If, however, the standard 44 is held to the support 43 by merely a bolt screwing into the support head and the crank shaft terminates near the sprocket 10, obviously the starting parts 52, 54 and 54' are omitted and starting is effected by rotating the engine fly wheel 55 or the belt wheel, the friction wheel in the latter case being in contact with the driving rim thereon. A convenient and preferred method by which the shaft 48' may be held rigidly to the standard 44 is by forming the shaft in three diameters the head of the standard being pressed on to the larger diameter 56 of the shaft by means of the sleeve or bush 57 which slidingly fits the shaft at its diameter 59 but which is forced against the head of the standard on screwing up the nut 58 on to the screw threaded end of the shaft 48'. The starting wheel 52 rotates on the sleeve or bush 57 which wheel is held on the bush or sleeve by the washer 59' which is pressed on the end of the sleeve or bush by the nut 58. The end of the shaft 48' at 48" may be squared to receive the square perforated boss 60 of the arm 61 which arm is provided with the eye 62 in which is secured one end of a spring 63 (in tension) the other end of which spring being attached to an eye piece 64 secured in the bar 8. By these means the friction wheel 14 is normally pressed in contact with the driving rim 17. The friction wheel is moved out of contact with the driving rim by any suitable means but preferably by a Bowden wire 8' attached at one end to the eye 8" on the bar 8 and secured at the other end to a suitable lever not shown but conveniently arranged relative to the driven machine.

The object of the spring both in regard to bicycles and to other light road vehicles, and to my machine driving unit lastly described is for insuring contact of the friction wheel with the driving surface for the starting of the engine by other than mechanical means as on the starting of the engine by mechanical means applied directly to the engine itself intial contact for actual driving purposes is effected by the natural tightening of the chain through which the friction wheel is driven, and the spring having also no function for maintaining an actual driving contact may be omitted if the engine is started mechanically. The arm 61 and the eye piece 64 are dispensed with when the spring is omitted.

The machine driving unit above described operates as a portable unit for driving light machinery and when employed it is conveniently arranged relatively to the machine to be driven and a driving belt is placed on to the belt wheel 49 and on to a driving pulley carried by the machine to be driven. When the machinist desires to interrupt the transmission of power he draws the friction wheel out of contact with the driving rim which when the transmission is to be resumed is returned to contact by means of the spring when used and by the pull of the chain on the friction wheel. It is to be understood that whether the device is applied to a bicycle or the like or to an engine or motor for driving machinery the friction wheel is so positioned relatively to the driving rim provided on the bicycle or the like road wheel or on the belt wheel with which the motor for driving machinery is furnished i. e. so suspended or supported that the friction wheel would always be free of and out of contact with the driving rim were the friction wheel not swung sidewise on to the driving rim. Preferably in the case of the bar 8 and the supports 19 and 20 such bar and supports are formed in such way that they may themselves be adjustable relatively to their length in any suitable manner. This adjustment will not only facilitate accurate positioning the device on bicycles and the like vehicles but it will enable the taking up of wear in the friction wheel in each case. I prefer to provide the sprocket chain with a few removable links, i. e. links which may be held together and to adjacent links in the chain by means of a screw and nut.

It is also to be understood that the object of pivoting the standard 44 is to enable the standard with the parts carried by same and the bar 8 and its accessories to be swung into any desired position in order that the whole unit may be adapted to being installed in awkward positions arising out of cramped or other conditions and the swing of the standard may also be utilized for the purpose of taking up slack in the driving belt. The swing of the standard (and with such standard the bar 8 also swings) is readily effected by loosening the nut 48 and when the standard 44 and accessories and therewith the bar 8 and its accessories are brought to the desired angle the nut is tightened up and the parts held at such angle.

The standard 44 may also be adjustably formed relative to its length to enable further accommodation of the unit to awkward positions, provision in this instance also being made for the shortening of the sprocket chain on the engine or motor starting means if employed.

In all cases I may provide the friction wheels or the driving rims, or both, with some suitable gripping material.

I am aware that prior to my invention it has been proposed to drive road vehicles and machines by means of a friction wheel or friction wheels carried by a rocking part, and thereby may be moved into and out of contact with a rim or other driving surface carried by the wheel or frame of the vehicle to be driven the friction wheels receiving motion from the source of power transmitted to the vehicle and to mount a rocking arm or casing (carrying a friction wheel) coaxially with a motor shaft through which the friction wheel receives motion. I, therefore, do not claim such a combination broadly, but, What I do claim as my invention and desire to secure by Letters Patent is:—

1. Gear for transmitting power from a motor, comprising a bar pivoted at one end coaxially with the crank shaft of the motor, a shaft journaled on the other end of the bar, a friction wheel and a sprocket wheel on the shaft, a sprocket wheel on the motor shaft, a sprocket chain joining the two sprocket wheels, a power transmitting wheel carrying an annular driving surface within its periphery, the parts being arranged so that the friction wheel may be disposed relative to said annular driving surface to contact with the driving surface at such point on the surface that the contact pressure of the friction wheel on the surface is increased as increased force is transmitted to the power transmitting wheel, and means for moving the friction wheel out of contact with the driving surface.

2. Gear for transmitting power from a motor to a bicycle or other road vehicle, comprising the combination of a motor adapted to be secured to the frame of a vehicle above the road wheel of the vehicle, a bar swingingly supported at one end coaxially with the crank shaft of the motor, a shaft journaled on the other end of the bar, a friction wheel and a sprocket wheel on the shaft, a sprocket wheel on the motor shaft, a sprocket chain joining the two sprocket wheels, a part carried by the vehicle wheel below the motor provided with an annular driving surface within the periphery of said wheel, the part being so arranged that the friction wheel may be disposed relative to said annular driving surface to contact with the driving surface at such point on the surface that the contact pressure of the friction wheel on the surface is increased as increased force is transmitted to the power transmitting wheel, and means for moving the friction wheel out of contact with the driving surface.

3. Apparatus for transmitting power from a motor to a bicycle or other road vehicle, comprising the combination of a motor adapted to be secured to the frame of the vehicle above a road wheel of the vehicle, a device on the road wheel having annular driving surfaces within the periphery of the wheel, and duplicate gears on both sides of said road wheel, each gear comprising a bar pivoted at one end coaxially with the crank shaft of the motor, a shaft journaled on the other end of the bar, a friction wheel and a sprocket wheel on the shaft, a sprocket wheel on the motor shaft, a sprocket chain joining the two sprocket wheels, the parts being arranged so that the friction wheel may be disposed relative to said annular driving surface to contact with the driving surface at such point on the surface that the contact pressure of the friction wheel on the surface is increased as increased force is transmitted to the power transmitting wheel, and means for moving the friction wheel out of contact with the driving surface.

4. Apparatus for transmitting power from a motor to a bicycle or other road vehicle, comprising the combination of a motor adapted to be secured to the frame of the vehicle above a road wheel of the vehicle, a device on the road wheel having annular driving surfaces within the periphery of the wheel, sprocket wheels on opposite ends of the motor shaft, a bar at each side of the vehicle pivoted at one end coaxially with the crank shaft of the motor, a shaft journaled on the free end of each bar, a friction wheel and a sprocket wheel on each shaft, a sprocket chain joining each sprocket wheel last-mentioned and the sprocket wheel on the motor shaft on that side of the vehicle, the parts being so arranged that each friction wheel may be disposed relative to one of the annular driving surfaces in contact therewith at such point thereon that the contact pressure of the friction wheel is increased as increased pressure is transmitted to the driving surface, and means for moving the friction wheel out of contact with the driving surface.

Dated 29th March, 1916.

HORACE LAWRENCE SHARPE.

Witnesses:
H. C. FOWLER,
B. H. FOWLER.